(12) United States Patent
Mohan

(10) Patent No.: US 7,979,321 B2
(45) Date of Patent: Jul. 12, 2011

(54) MERCHANDISING ITEMS OF TOPICAL INTEREST

(75) Inventor: Sunil Mohan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 1020 days.

(21) Appl. No.: 11/828,086

(22) Filed: Jul. 25, 2007

(65) Prior Publication Data
US 2009/0030803 A1 Jan. 29, 2009

(51) Int. Cl.
*G06Q 30/00* (2006.01)
(52) U.S. Cl. ................. 705/26.7; 705/26.8
(58) Field of Classification Search .......... 705/26, 705/27
See application file for complete search history.

(56) References Cited

U.S. PATENT DOCUMENTS

| | | | |
|---|---|---|---|
| 6,081,774 A | 6/2000 | de Hita et al. | |
| 6,101,486 A * | 8/2000 | Roberts et al. | 705/14.66 |
| 6,338,055 B1 | 1/2002 | Hagmann et al. | |
| 6,463,428 B1 | 10/2002 | Lee et al. | |
| 6,999,957 B1 | 2/2006 | Zamir et al. | |
| 7,031,961 B2 | 4/2006 | Pitkow et al. | |
| 7,257,577 B2 | 8/2007 | Fagin et al. | |
| 7,295,995 B1 | 11/2007 | York et al. | |
| 2002/0077930 A1* | 6/2002 | Trubey et al. | 705/26 |
| 2003/0065655 A1 | 4/2003 | Syeda-Mahmood | |
| 2003/0200192 A1 | 10/2003 | Bell et al. | |
| 2005/0091120 A1* | 4/2005 | Auletta | 705/26 |
| 2006/0259462 A1 | 11/2006 | Timmons | |
| 2006/0294086 A1 | 12/2006 | Rose et al. | |
| 2007/0094247 A1 | 4/2007 | Chowdhury et al. | |
| 2007/0214460 A1* | 9/2007 | Tsai et al. | 719/318 |
| 2007/0233736 A1* | 10/2007 | Xiong et al. | 707/104.1 |
| 2008/0033938 A1 | 2/2008 | Okamoto | |
| 2009/0150214 A1 | 6/2009 | Mohan | |
| 2009/0259620 A1 | 10/2009 | Ahene et al. | |

OTHER PUBLICATIONS

"RSS—Wikipedia, the free encyclopedia", http://en.wikipedia.org/wiki/RSS, (Apr. 9, 2008).
"Topical—Definition from the Merriam-Webster Online Dictionary", http://www.merriam-webster.com/dictionary/topical, (Downloaded Apr. 9, 2008).
"Yahoo! Buzz Index", http://buzzlog.buzz.yahoo.com/rss_info/, (2008).
"Collective Discovery Network", http://www.aggregateknowledge.com/services/network.html, Aggregate Knowledge, Inc.,(Copyright 2006-2007).
"Discovery for Media", http://www.aggregateknowledge.com/services/media.html, Aggregate Knowledge, Inc.,(Copyright 2006-2007).
"Discovery for Retail", http://www.aggregateknowledge.com/services/retail.html,.Aggregate Knowledge, Inc.,(Copyright 2006-2007).
Bomhardt, Christian , "NewsRec, a SVM-driven Personal Recommendation System for News Websites", *Proceedings of the 2004 IEEE/WIC/ACM International Conference on Web Intelligence*, (2004),545-548. Jia, Jack , "The Long Tail of E-Commerce", *E-Commerce Times*, http://www.ecommercetimes.com/story/57766.html,(Jun. 11, 2007).
Porter, Joshua , "Watch and Learn: How Recommendation Systems are Redefining the Web", http://www.uie.com/articles/recommendation_systems, (Dec. 13, 2006).
"U.S. Appl. No. 12/082,565 Non-Final Office Action mailed Sep. 17, 2010", 19 pgs.

* cited by examiner

*Primary Examiner* — Jeffrey A Smith
*Assistant Examiner* — Courtney Stopp
(74) *Attorney, Agent, or Firm* — Schwegman, Lundberg & Woessner, P.A.

(57) ABSTRACT

Various embodiments are described herein that provide one or more of a systems, methods, software, and data structures within an Internet marketp lace context that are useful to promote products that may be associated with an event occurrence. Some embodiments further utilize collaborative filtering to augment event-based product recommendations.

19 Claims, 5 Drawing Sheets

FIG. 5

HELLO JOHNSMITH (152)

PERSONALIZED PICKS IN SPORTS MEMORABILIA

HERE ARE SOME PICKS YOU MIGHT LIKE:

PRODUCTS SELECTED FOR YOU BASED ON YOUR INTEREST IN THE LOS ANGELES LAKERS AND KOBE BRYANT'S RECENT SCORING EVENTS:

- JERSEY
- POSTER
- SIGNED 8X10
- KOBE COLLECTABLES

RELATED SPORTS STORIES:
- KOBE SCORES AGAIN, AGAIN, AGAIN, AGAIN, . . .
- KOBE: I JUST WANT TO DO WHAT I CAN DO

OTHER SPORTS MEMORABILIA

- "BRING PRO FOOTBALL BACK TO LA!" BUMPER STICKER

- "PRO FOOTBALL RAMS LA: PRO FOOTBALL TO LEAVE LOS ANGELES" - 1990 SPORT NEWS MAGAZINE

MERCHANDISING ITEMS OF TOPICAL INTEREST

BACKGROUND INFORMATION

Today, many goods and services are offered for sale on the Internet. Consumers are provided with unprecedented product access. Also, sellers are provided with significantly increased market reach to consumers that were previously unreachable to them. However, as a result of increased access, where consumers in a conventional bricks-and-mortar shopping environment may have had only a single source from which to procure a single product to meet a certain need, consumers are now confronted with multiple sources of multiple products to meet that same need. Further, consumers commonly have access to products that may meet an unrealized need. Also, with so many products being offered, the task of finding a product of interest and learning about the availability of such products is becoming an evermore daunting task.

BRIEF DESCRIPTION OF THE DRAWINGS

FIG. 5 is an example user interface illustration according to an example embodiment.

DETAILED DESCRIPTION

Figure 1:
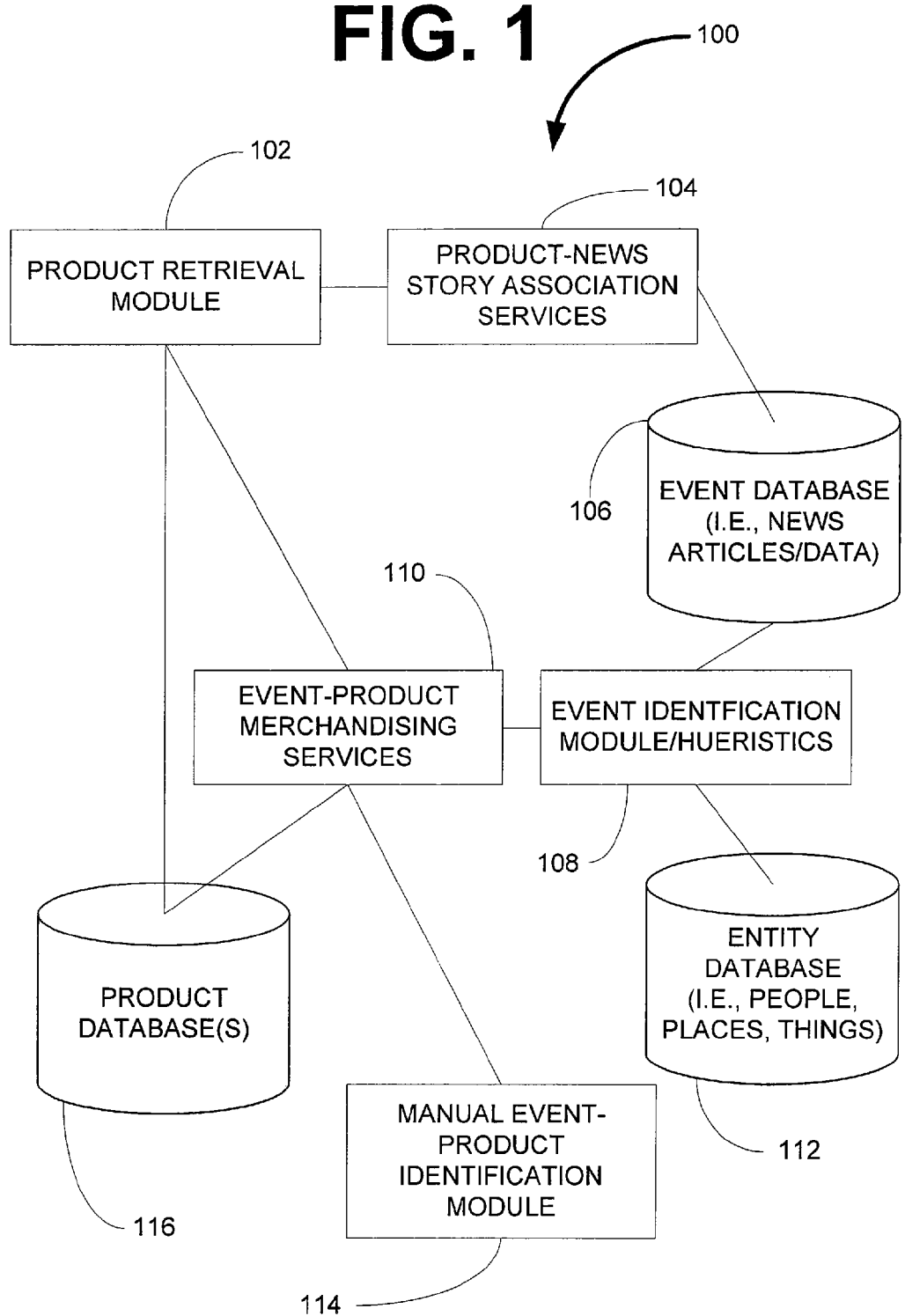
FIG. 1 is a logical block diagram of a system according to an example embodiment.

Various embodiments are described herein that provide one or more of a systems, methods, software, and data structures within an Internet marketplace context that are useful to promote products that may be associated with an event occurrence. An event can be virtually anything that has happened or will happen. For example, an event may be a news event such as a death of a political figure, a sporting event such as an athlete surpassing a long standing record, an upcoming or recently passed holiday or anniversary of a previous event, and the like. An event may also be a product release, such as the release of a highly anticipated book, music recording, mobile telephone, and other products. Such events often cause a surge in public interest. For example, Kobe Bryant scoring 50+ points for the fourth time in the NBA season (2006-7), or the death of Anna Nicole Smith. Such an event often leads to a corresponding interest surge in products that are related in some fashion to the event in both product availability and product sales.

In some embodiments, event-based merchandising of products within an Internet marketplace involves one or more elements. The elements may include identifying events, associating events with one or more of products, product categories, and product searches, identifying one or more products to promote to a particular shopper, and providing the one or more identified products to the shopper. Each of these element will be described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 according to an example embodiment. The example system 100 includes a product retrieval module 102, product-news story association services 104, an event database 106, and an event identification module 108. The example system further includes event-product merchandising services 110, an entity database 112, a manual event-product identification module, and a product database 116.

In typical embodiments, the product retrieval module 102 receives a request for products to display in a web page, such as from a process that executes to build webpages. The product retrieval module 102 may obtain products from the product database 116 or through a event-product merchandising service 110. The event-product merchandising service 110 may include one or more services to provide product listings for webpages based at least in part on identified event occurrences.

In some embodiments, event occurrences may be manually specified through the manual event-product identification module 114 or automatically identified by the event identification module 108. However, some embodiments not only include automatic event identification by the event identification module 108, but also allow manual event identification through use of the manual event-product identification module 114. Manual event identification may include receiving input creating relationships between an entity record in the entity database 112 and event records of the event database 106. Manual event identification may also include inputting a product identifier and a product release date, such as when the event is a release date of a highly anticipated product.

The event identification module 108 may include heuristics to identify event occurrences in news stories or other data stored in the event database 106 in view of data of an entity database 112. The entity database 112 includes data for which events may be tied to or searched for by the heuristics of the event identification module 108. The data in the entity database 112 may identify people, such as celebrities, places such as cities or parks, or things such as books, teams, groups, and organizations. The data in the entity database 112 may also identify products which may be useful when the product is highly popular, highly anticipated, or when reviews are published.

The event database 106 may include full news story text or abstracts, or other data such as press releases, blog postings, product manuals, or other textual documents or data that may include event data. The event database 106 may exist within a computing environment of the other portions elements of the system 100. However, the event database 106, in some embodiments, may be one or more websites from which event occurrences may be identified. The websites may be news websites or other websites that identify event occurrences. These websites may be retrieved and identified by heuristics of the event identification module 108 in view of data stored in the entity database 112. When an event is identified, a notification of the event may be stored in one or more of the entity database 112, a second event database 106, the product database 116, or held by the event-product merchandising services 110.

In some embodiments, an event may also be associated with one or more queries. For example, if a query is submitted by a prospective purchaser for "mobile telephones," a product release date event for a mobile telephone including an MP3 player may be associated with the query. This association may be to the exact text of anticipated queries or one or more key words that may be included in a query.

The event identification module 108 may identify events based on default or customized event identification heuristics. This may include processing data in the event database, such as a news story, and removing all extraneous words leaving only nouns. Each unique noun may then be counted and the counts compared against entity data in the entity database 112. An event of interest may be identified in some embodiments based on a count of a particular noun from the entity database appearing in several news stories over a certain period. The count and the period may be configured in some embodiments to adjust the sensitivity of the heuristics in identifying events. The count and period may also be specified for each of one or more nouns in the entity database. In further embodiments, nouns may be associated with categories and a category may include such sensitivity settings. As a result, news stories including sports figures may have a higher sensitivity than celebrities.

Thus, when the product retrieval module 102 retrieves products through the event-product merchandising service 110, the event-product merchandising service 110 receives identified events from one or both of the event identification module 108 and manual event-product identification module 114. The event-product merchandising service 110 then searches for products related to such events, such as performing a search of the product database 116 as a function of a noun related to an identified event. Product search results are then forwarded back to the product retrieval module 102. In some embodiments, the event-product merchandising service 110 may also provide one or more links to news stories associated with one or more events.

Figure 2:
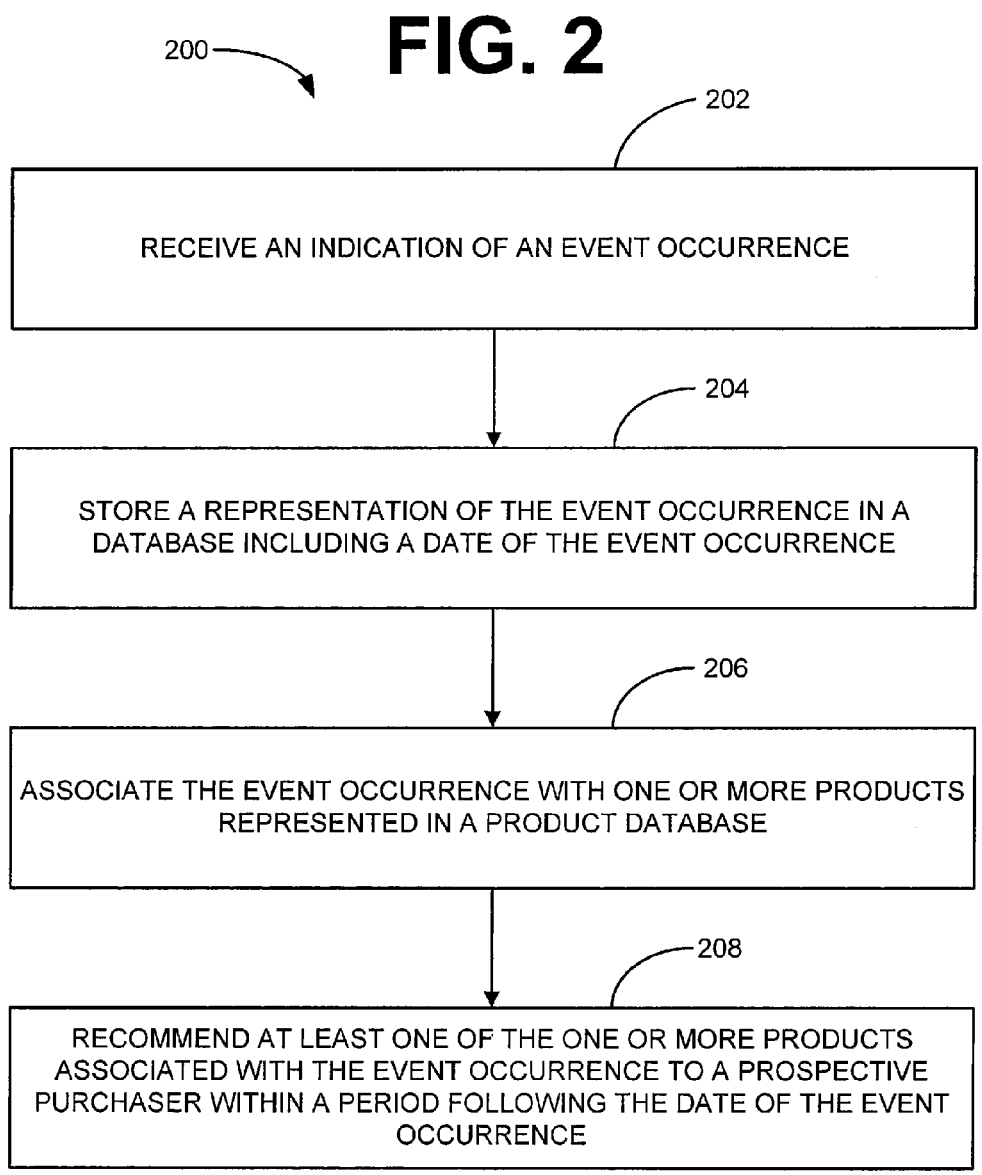
FIG. 2 is a block flow diagram of a method according to an example embodiment.

FIG. 2 is a block flow diagram of a method 200 according to an example embodiment. The example method 200 is a method of recommending one or more products to a prospective purchaser in view of one or more event occurrences. The example method includes receiving an indication of an event occurrence 202, storing a representation of the event occurrence in a database including a date of the event occurrence 204, and associating the event occurrence with one or more products represented in a product database 206. The example method 200 further includes recommending at least one of the one or more products associated with the event occurrence 206 to a prospective purchaser within a period following the date of the event occurrence 208.

The period following the date of the event occurrence may be an administrative setting based on a particular product or product category the event is associated with. As a result, one product or product category may be recommended a period longer or short than another product or product category having a different administratively set period. The period for recommendation of products or services may alternatively be an adaptive period learned by a system implementing the method according to any number of adaptive learning processes that are readily known to one of ordinary skill in the art. The period may also be a default period.

In some embodiments, the period following the date of the event occurrence may be adaptive. For example, if product recommendations are made for products associated with an event and those recommendations continue to yield a noteworthy success rate in prompting purchases or other actions, the period may be automatically extended until a point where purchases or other actions fall off.

In some embodiments, associating the event occurrence with one or more products represented in the product database 206 includes associating the event occurrence with at least one category of products represented in the product database. For example, if the identified event is Kobe Bryant scoring 50+ points in four consecutive basketball games for the Los Angeles Lakers, the event may be associated with one or more product categories such as Los Angeles Lakers merchandise and Kobe Bryant merchandise. However, the event may also, or alternatively, associated with one or more particular products, such as Kobe Bryant authentic jerseys and Kobe Bryant rookie collectable card. An event may also be associated with a query including terms extracted from event descriptions or other event data such as associated entities or categories.

Figure 3:
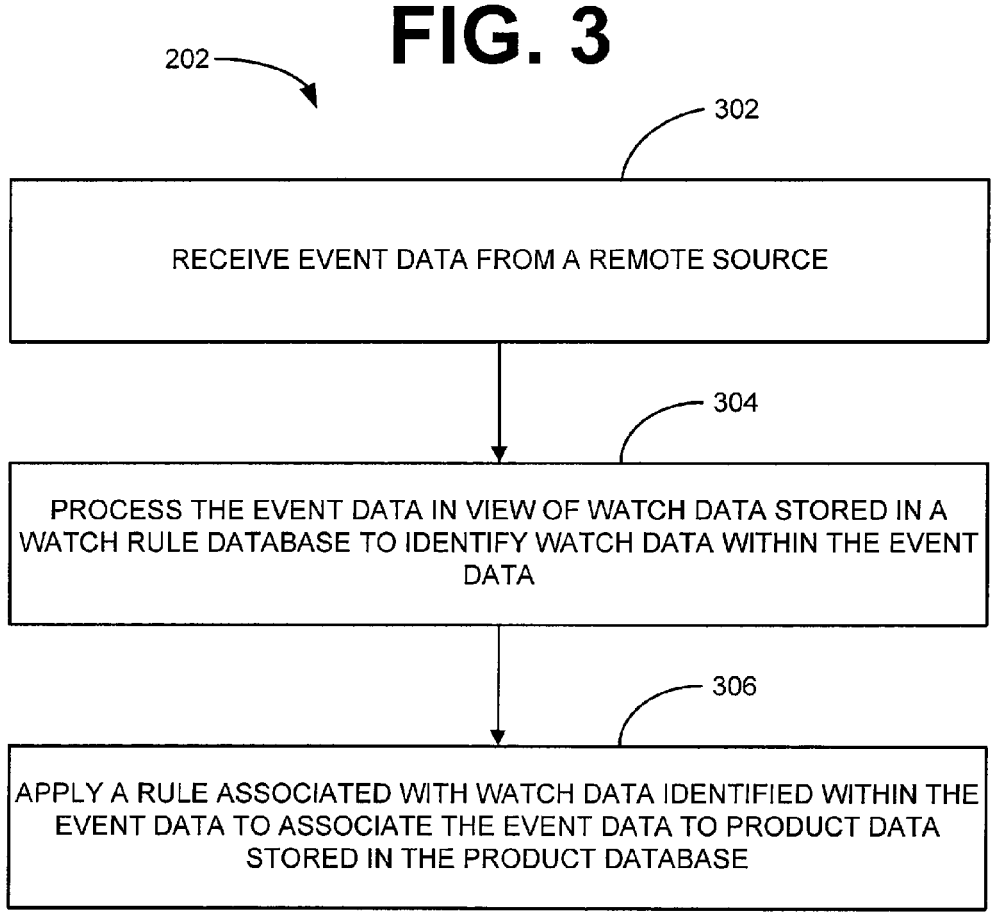
FIG. 3 is a block flow diagram of a method according to an example embodiment.

FIG. 3 is a block flow diagram of a method according to an example embodiment. The method of FIG. 3 provides an example of a process of receiving an indication of an event occurrence 202. The example process of receiving an indication of an event occurrence 202 includes receiving event data from a remote source 302, processing the event data in view of watch data stored in a watch rule database to identify watch data within the event data 304, and applying a rule associated with watch data identified within the event data to associate the event data to product data stored in the product database 306. In some embodiments, the watch rule database is a database, such as entity database 112 of FIG. 1, including data identifying people, places, or things (i.e., nouns) to search for and identify within the event data. In some such embodiments, each item of watch data includes a rule that may be applied to determine if an event should be identified within an item of event data, such as a news story. A rule may specify a minimum number of occurrences of a noun and other data items to search for in the event data. For example, a rule may specify that if Kobe Bryant's name appears in an article at least seven times and the words "record" and "scoring" appear within three words of each other, an event is identified. Another rule may be a cumulative rule that counts occurrences multiple sources. For example, a rule may specify that if event data from a particular source, such as a sports news website, includes three or more articles on any given day with a particular sports team name, athlete name, or coach name occurring a minimum number of times in each of the three or more articles, an event occurrence is identified. A watch rule also typically includes a rule to associate events identified through application of the rule to one or both of one or more products and product categories.

In some embodiments, the watch rules may include data to feed one or more data processing algorithms. In some such embodiments, the one or more algorithms may be derived from the Information Extraction branch of Information Retrieval and Natural Language Processing. This analysis may be further assisted by a database of tagged entities such as a list of celebrities with related topical categories or a list of periodic events.

In some embodiments, receiving event data from a remote source 302 includes executing a trawling process that retrieves web pages from one or more web sites. The trawling may be performed by a process of the type commonly referred to as a "spider." The trawling process typically retrieves web pages including news stories, or references thereto, and applies the watch rules. In some embodiments, when a watch rule is applied and an event is identified, the trawling process provides notification of the event and a link to the retrieved webpage within which the event was identified. As a result, when a product or product category is recommended as a function of the identified event, a link to the source of the event identification may also be provided. Prospective purchasers may then receive not only product recommendations based on event occurrences, but also find a link to a news story or other webpage providing greater detail about the event occurrence.

Figure 4:
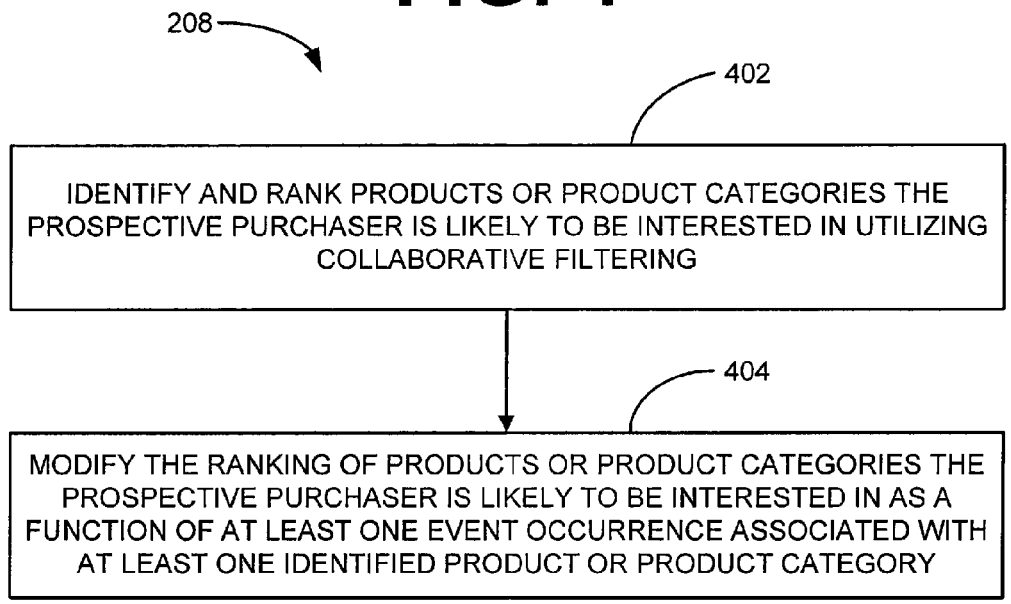
FIG. 4 is a block flow diagram of a method according to an example embodiment.

FIG. 4 is a block flow diagram of a method according to an example embodiment. The method of FIG. 4 is an example, according to some embodiments, of recommending at least one of the one or more products associated with the event occurrence to a prospective purchaser within a period following the date of the event occurrence 208 as illustrated and described above with regard to FIG. 2. This example embodiment includes identifying and ranking products or product categories the prospective purchaser is likely to be interested in utilizing collaborative filtering 402. The example embodiment further includes modifying the ranking of products or product categories the prospective purchaser is likely to be interested in as a function of at least one event occurrence associated with at least one identified product or product category 404.

Collaborative filtering is a mechanism by which predictions may be made about the interests of individual entities, such as prospective purchasers, by collecting information from many entities. The underlying assumption of collaborative filtering is that those who have agreed, will agree again. For example, one application of collaborative filtering may make predictions of what music, or other products, product categories, searches, or other offerings, an entity may be interested in based on information of previous entity actions such as purchases, searches, demographics, and other entity transactions and information. These predictions are specific to the entity, but such predictions are made using information collected from many entities. As a result, information of products, services, searches, and other information may be specifically tailored to an entity that are more likely to generate further entity activity, such as purchases, than non-tailored information. In some instances, the information may provide a recommendation of a product an entity may be interested in, may not otherwise be aware of, or even an alternate product that the entity may be interested in purchasing instead a product being viewed. In further instances, the information may provide a search that is likely to net products of interest to the entity.

Thus, identifying and ranking products or product categories the prospective purchaser is likely to be interested in utilizing collaborative filtering 402 provides one or both of a set of products and product categories of likely interest. These sets may then be ranked or reranked in view of related events. As a result, a set of recommendations tailored to the specific prospective purchaser are made in view of current events.

FIG. 5 is an example user interface illustration according to an example embodiment. The user interface is an example of a user interface that recommends products to a prospective purchaser. The example user interface in this embodiment is tailored to user John Smith in area 502 using collaborative filtering and identified events. However, other embodiments recommend products based only on events. This example interface recommends products to prospective purchaser John Smith who has shown a previous interest in the Los Angeles Lakers basketball team. As a result of this interest and an event occurrence concerning Kobe Bryant, a player for the Los Angeles Lakers, various products are recommended in area 504. Some embodiment may also provide links to news stories or other websites providing further information related to the event.

Some embodiments, as illustrated in the user interface of FIG. 5, may further include other recommendations derived from one or both of an event occurrence and identified interests. For example, John Smith is interested in pro sports and Los Angeles. As a result, identified events, products, or products related to identified events may be recommended in area 510. Thus, John Smith receives recommendations of products related to both pro sports and Los Angeles.

Although the user interface of FIG. 5 is illustrated as a webpage, the same data may be placed in an email and sent to John Smith. Thus, not only may the embodiments described here that recommend products to prospective purchasers based on identified events be provided when a user visits an Internet marketplace, the events and recommendations may be pushed to prospective purchasers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A non-transitory computer readable medium, with instructions thereon, which when executed, cause a suitably configured computing system to:
   receive a product listing request;
   identify at least one product related to at least one news event occurrence in a news event database, the news event database storing data representative of news stories; and
   respond to the product listing request with a product listing including the at least one identified product.

2. The non-transitory computer readable medium of claim 1, wherein receiving a product listing request includes receiving a request for a web page from an Internet-based marketplace.

3. The non-transitory computer readable medium of claim 1, wherein the product listing request includes a request for products within at least one product category.

4. The non-transitory computer readable medium of claim 1, with further instructions thereon, which when executed, cause the suitable configured computing system to identify news event occurrences by:
   receiving news event data from a remote source;
   processing the news event data in view of event watch rules including key words and threshold limits, which when achieved indicate occurrence of a news event related to a respective watch rule; and
   storing, in the news event database, an indication of each identified news event occurrence and a date the respective news event is identified.

5. The non-transitory computer readable medium of claim 4, wherein the remote source is a news organization.

6. The non-transitory computer readable medium of claim 5, wherein receiving news event data from the news organization includes receiving at least partial data of new stories into the news event database of the computing system.

7. The non-transitory computer readable medium of claim 4, wherein the instructions to identify at least one product related to news event occurrence, when executed, further cause the suitably configured computing system to:
   apply a product association rule of a watch rule for which a news event is identified to associate at least one product with the identified news event.

8. The non-transitory computer readable medium of claim 7, wherein a product association rule associates an identified news event occurrence with one or both of one or more products and one or more product categories.

9. A method comprising:
   receiving a product listing request in a product retrieval module that executes on at least one computer processor;
   identifying, through execution instructions on the at least one processor of instructions of at least one event-product merchandising service, at least one product related to a news event occurrence represented in a news event database; and
   responding to the product listing request with a product listing including the at least one identified product related to a news event represented in the news event database.

10. The method of claim 9, wherein receiving a product listing request includes receiving a request for a web page from an Internet-based marketplace.

11. The method of claim 9, wherein the product listing request includes a request for products within at least one product category.

12. The method of claim 9, further comprising:
   receiving news event data from a remote source;
   processing the news event data in view of event watch rules including key words and threshold limits, which when achieved indicate occurrence of a news event related to a respective watch rule; and
   storing an indication of each identified event occurrence and a date the respective news event is identified.

13. The method of claim 12, wherein the remote source is a news organization.

14. The method of claim 13, wherein receiving event data from the news organization includes receiving at least partial data of news stories into a database of the computing system.

15. The method of claim 12, wherein identifying at least one product related to a news event occurrence includes:
   applying a product association rule of a watch rule for which a news event is identified to associate at least one product with the identified news event.

16. The method of claim 15, wherein a product association rule associates an identified news event occurrence with one or both of one or more products and one or more product categories.

17. A system comprising:
   at least one processor;
   at least one memory device;
   a network interconnection device; and
   an instruction set held in the at least one memory device and executable on the at least one processor to:
      receive a product listing request via the network interconnection device;
      identify at least one product in a product database accessible via the network interconnection device, the at least one product related to a news event occurrence in a news event database accessible via the network interconnection device, the news event database storing data representative of news stories; and
      respond to the product listing request with a product listing including the at least one identified product, the responding including sending data to a source of the product listing request via the network interconnection device.

18. The system of claim 17, wherein receiving a product listing request includes receiving a request for a web page from an Internet-based marketplace.

19. The system of claim 17, with further instructions held in the at least one memory device that are executable by the at least one processor to identify news event occurrences by:
   receiving news event data from a remote source via the network interconnection device;
   processing the news event data in view of event watch rules including key words and threshold limits, which when achieved indicate occurrence of a news event related to a respective watch rule; and
   storing, in the news event database, an indication of each identified event occurrence and a date the respective event is identified.

* * * * *